(12) United States Patent
Ariki et al.

(10) Patent No.: US 7,543,896 B2
(45) Date of Patent: Jun. 9, 2009

(54) PRESSURE REGULATING RESERVOIR AND VEHICULAR BRAKING APPARATUS USING IT

(75) Inventors: Fumiyoshi Ariki, Kariya (JP); Shin Sasaki, Kariya (JP)

(73) Assignee: Advics Co., Ltd., Aichi-pref. (JP)

( * ) Notice: Subject to any disclaimer, the term of this patent is extended or adjusted under 35 U.S.C. 154(b) by 559 days.

(21) Appl. No.: 11/259,057

(22) Filed: Oct. 27, 2005

(65) Prior Publication Data
US 2006/0091725 A1 May 4, 2006

(30) Foreign Application Priority Data
Nov. 4, 2004 (JP) ............................. 2004-320412
Sep. 20, 2005 (JP) ............................. 2005-271959

(51) Int. Cl.
B60T 8/42 (2006.01)

(52) U.S. Cl. .................. 303/115.4; 303/115.1

(58) Field of Classification Search .............. 303/115.4, 303/119.2; 137/596.17, 614.14; 251/315.01
See application file for complete search history.

(56) References Cited

U.S. PATENT DOCUMENTS

| | | | | |
|---|---|---|---|---|
| 4,872,638 A | * | 10/1989 | Thompson et al. | 251/54 |
| 5,273,139 A | * | 12/1993 | Kotarra et al. | 188/362 |
| 5,556,175 A | * | 9/1996 | Hayakawa et al. | 303/119.2 |
| 6,092,781 A | * | 7/2000 | Hohl et al. | 251/129.02 |
| 6,113,066 A | * | 9/2000 | Hohl et al. | 251/129.02 |
| 6,152,420 A | * | 11/2000 | Hohl | 251/129.02 |
| 6,302,498 B1 | | 10/2001 | Ariki et al. | |
| 6,910,745 B2 | * | 6/2005 | Inage et al. | 303/115.4 |
| 7,367,636 B2 | * | 5/2008 | Ho | 303/119.2 |

* cited by examiner

Primary Examiner—Christopher P Schwartz
(74) Attorney, Agent, or Firm—Posz Law Group, PLC

(57) ABSTRACT

A pressure regulating reservoir is structured such that a major diameter portion of a shaft contacts a bottom surface of a valve seat, whereas a top surface of a piston does not contact an upper end surface of a wall forming a reservoir chamber in a housing. Therefore, a lift amount of a ball valve can be set using a portion above the major diameter portion of the shaft that contacts the bottom surface of the valve seat. That is, the lift amount can be set using only a dimension in the axial direction of a minor diameter portion of the shaft.

16 Claims, 10 Drawing Sheets

PRESSURE REGULATING RESERVOIR AND VEHICULAR BRAKING APPARATUS USING IT

CROSS REFERENCE TO RELATED APPLICATION

This application is based upon and claims the benefit of Japanese Patent Applications No. 2004-320412 filed on Nov. 4, 2004 and No. 2005-271959 filed on Sep. 20, 2005, the content of which are incorporated herein by reference.

FIELD OF THE INVENTION

The present invention relates to a pressure regulating reservoir that is applied to a brake hydraulic pressure control such as ABS control for a vehicle, and a vehicular braking apparatus using the pressure regulating reservoir.

BACKGROUND OF THE INVENTION

A vehicular braking apparatus that executes ABS control using a pressure regulating reservoir (switch reservoir) is disclosed in Japanese Patent Laid-Open Publication No. 2000-142346. The pressure regulating reservoir illustrated by Japanese Patent Laid-Open Publication No. 2000-142346 will be described with reference to FIG. 11.

FIG. 11 is a cross sectional view showing a cross section of the pressure regulating reservoir. As shown in the figure, the pressure regulating reservoir has a structure including a hollow portion that forms a reservoir chamber J2 in a housing J1 forming a brake conduit. The following are included inside the hollow portion: a ball valve J3, a valve seat J4, a filter component J5, a piston J6 with a shaft J7 fixed thereto, a spring J8, and a stopper J9.

The ball valve J3, the valve seat J4, and the filter component J5 are formed as a unit, such that the ball valve J3 is mounted on the filter component J5 and the valve seat J4, when the filter component J5 and the valve seat J4 are fixed. Disposed inside the filter component J5 is the spring J10, which biases the ball valve J3 towards a side of the valve seat J4.

The piston J6 is structured so as to be capable of sliding against an inner wall of the hollow portion of the housing J1 forming the reservoir chamber J2. Designated as top dead center is a stepped portion formed by a wall of the hollow portion of the housing J1 forming the reservoir chamber J2. Furthermore, a step or groove (not shown) is provided on an upper surface of the piston J6 so that the entire surface of the piston J6 does not contact the housing J1 when the piston J6 and the housing J1 come in abutment. The purpose of this is to facilitate the flow of brake fluid from an suction hole to a discharge hole.

The piston J6 slides against an inner wall of the hollow portion of the housing J1 forming the reservoir chamber J2. When this occurs, there is considerable slide resistance if both the housing J1 and the piston J6 are metal, for which a countermeasure is required to lower the slide resistance. However, the slide resistance becomes small in the case of a resin piston J6, making the countermeasure to lower slide resistance unnecessary. Thus, the piston J6 is provided with a wear ring J11 made from resin to facilitate sliding against the inner wall of the metal housing J1, and is also provided with an O-ring J12 that functions as a seal.

The shaft J7 is press-fit into a concave portion formed at a central position of the piston J6. The shaft J7 is also structured such that an end of the shaft J7 contacts the ball valve J3 via a hole in the valve seat J4 when the piston J6 is accommodated in the hollow portion of the housing J1 forming the reservoir chamber J2.

Also formed on the housing J1 are two passages J13, J14 that communicate with the reservoir chamber J2. In the passage J13, the unit comprising the ball valve J3, the valve seat J4, and the filter component J5 are caulked and fixed thereto.

In the pressure regulating reservoir structured as described above, during normal braking the piston J6 is pressed upward in the cross section of FIG. 11 by the elasticity force of the spring J8. This in turn causes an end of the shaft J7 to move the ball valve J3 away from the seat of the valve seat J4. When brake fluid is then supplied via the passage J13, the brake fluid thus accumulates in the reservoir chamber J2 via the hole in the valve seat J4. The accumulated brake fluid in the reservoir chamber J2 is sucked up by a pump (not shown) via the passage J14 and then supplied to wheel cylinders (hereinafter as referred to W/Cs, not shown).

After a predetermined amount of brake fluid has accumulated in the reservoir chamber J2; and a slide amount of the piston J6 has become greater than an offset amount between the ball valve J3 and the valve seat J4, i.e., a lift amount of the ball valve J3, the ball valve J3 contacts the seat of the valve seat J4 again. Accordingly, the passage J13 is closed, and the brake fluid flow into the reservoir chamber J2 via the passage J13 is regulated. In this manner, brake fluid is prevented from flowing into the reservoir chamber J2 until the piston J6 reaches bottom dead center. Furthermore, high-pressure brake fluid farther upstream than the pressure regulating reservoir (on the passage J13 side) is not supplied as is downstream (to the passage J14 side).

In the above-described pressure regulating reservoir, the lift amount of the ball valve J3 is controlled to regulate the flow of brake fluid into the reservoir chamber J2. In other words, the lift amount of the ball valve J3 is determined by the positional relationship of the ball valve J3 and the end of the shaft J7. Therefore, the positional relationship of the ball valve J3 and the end of the shaft J7 is controlled.

However, assembly errors may occur when integrating the shaft J7 into the piston J6, or when assembling the unit including the ball valve J3, the valve seat J4 and the filter component J5 to the passage J13. The effects of these assembly errors, as well as variations in the dimensional accuracy of each component, often make it difficult to achieve the above control.

SUMMARY OF THE INVENTION

It is an object of the present invention to provide a pressure regulating reservoir easily capable of controlling a lift amount of a ball valve, and a vehicular brake apparatus using it.

In order to achieve the above object, according to a first aspect of the present invention, a shaft has a structure provided with a minor diameter portion inserted in a hole portion of a valve seat; and a positioning portion that includes a positioning contact point that contacts a bottom surface of the valve seat, wherein the seat surface is formed on an end of the minor diameter portion.

Moreover, a discharge conduit is connected to a portion that is formed from an upper end surface of a wall forming a reservoir chamber in a housing.

Furthermore, when the positioning contact point of the positioning portion of the shaft contacts with the bottom surface of the valve seat, a space is formed between a top surface of a piston and the entire surface of an upper end surface of the wall forming the reservoir chamber in the housing.

According to the above mentioned structure, the positioning portion of the shaft contacts the bottom surface of the valve seat, and the top surface of the piston does not contact the upper end surface of the wall forming the reservoir chamber in the housing. Therefore, a lift amount of a ball valve can be set using a portion above the positioning portion of the shaft that contacts the bottom surface of the valve seat. That is, the lift amount can be set using only a dimension in the axial direction of a minor diameter portion of the shaft.

Accordingly, it is possible to cancel out any variations that may occur when integrating the shaft with the piston, or from fixing the valve seat inside the reservoir port. A pressure regulating reservoir can thus be achieved that is easily capable of controlling the lift amount of the ball valve.

According to a second aspect of the present invention, the shaft and the piston are formed from one material.

As described above, the lift amount of the ball valve can be controlled by using a portion above the positioning portion of the shaft, that is, using only a dimension the minor diameter portion. Therefore, even if the positioning portion and the piston are formed through integral molding, this has no effect on control of the lift amount of the ball valve. For this reason, forming the shaft and the piston from the same material makes it possible to simplify components of the pressure regulating reservoir.

In this case, according to a third aspect of the present invention, forming the shaft and the piston from resin makes it possible to eliminate a wear ring that is required when the piston is formed from metal.

According to a fourth aspect of the present invention, the shaft is formed of metal and the piston is formed of resin, with the shaft and the piston formed through integral molding such that a portion of the shaft is embedded in the piston, and a structure for preventing separation from the piston is formed on the portion of the shaft embedded in the piston.

As described above, the shaft may be formed of metal, and the piston formed of resin. In such a case, for example, forming a groove on the shaft can prevent the shaft from separating from the piston.

According to a fifth aspect of the present invention, at least one of the valve seat and the positioning portion of the shaft has a notch that communicates with the discharge conduit and the hole portion of the valve seat even when the bottom surface of the valve seat and the positioning contact point contact with each other.

Providing a notch in the shaft can thus ensure communication between the discharge conduit and the hole portion of the valve seat, even when the bottom surface of the valve seat and the positioning contact point contact with each other.

According to a sixth aspect of the present invention, at least one of the bottom surface of the valve seat and the positioning portion of the shaft has at least one protrusions that communicates with the discharge conduit and the hole portion of the valve seat even when the bottom surface of the valve seat and the positioning contact point contact with each other.

As described above, a portion other than the at least one protrusions can also thus ensure communication between the discharge conduit and the hole portion of the valve seat.

Also note that for the positioning portion mentioned above, it is possible to employ a major diameter portion with a cylindrical shape according to a seventh aspect of the present invention, whose diameter is larger than the minor diameter portion.

According to an eighth aspect of the present invention, at least a portion of the minor diameter portion of the shaft, other than the seat surface formed on the end of the shaft, is formed such that a cross sectional area of a surface perpendicular to the axial direction of the minor diameter portion progressively decreases from the major diameter portion side of the shaft towards the end.

The above mentioned configuration, allows for a larger cross sectional area of the portion where fluid flows in the hole portion of the valve seat. Accordingly, it is possible to increase the supply of brake fluid by a corresponding amount.

For example, according to a tenth aspect of the present invention, if the seat surface is a surface inclined with respect to the axial direction of the minor diameter portion, the minor diameter portion may be formed with a two-stepped tapered shape by the seat surface and a tapered surface displaced from the seat surface in the axial direction of the minor diameter portion. Moreover, according to an eleventh aspect of the present invention, the end of the minor diameter portion may alternatively include a conical shape. Furthermore, tapered surfaces may alternatively be provided on both sides of the seat surface at the end of the minor diameter portion according to a twelfth aspect of the present invention.

According to a thirteenth aspect of the present invention, a contact location between the bottom surface of the valve seat and the positioning portion is positioned in a flow passage where a flow heads toward the discharge conduit via the hole portion of the valve seat.

By thus positioning the contact location between the bottom surface of the valve seat and the positioning portion in a flow passage, a foreign substance can be discharged to outside the pressure regulating reservoir when fluid is sucked up through the discharge conduit even when the foreign substance is sandwiched between the bottom surface of the valve seat and the positioning portion.

For example, according to a fourteenth aspect of the present invention, a diameter of the contact location between the bottom surface of the valve seat and the positioning portion may be smaller than a diameter of the piston. This can allow more fluid to flow over the entire region of the contact location between the bottom surface of the valve seat and the positioning portion. Consequently, the above effect can be more effectively obtained.

According to a fifteenth aspect of the present invention, a brake apparatus includes the pressure regulating reservoir according to any one of the first to fourteenth aspects. The brake apparatus is also provided with: a brake hydraulic pressure generating mechanism that generates brake hydraulic pressure based upon a depression force; a braking force generating mechanism that generates a braking force based upon the brake hydraulic pressure; a main conduit that is connected to the brake hydraulic pressure generating mechanism and transmits the brake hydraulic pressure to the braking force generating mechanism; an auxiliary conduit that is connected to the brake hydraulic pressure generating mechanism and supplies brake fluid to the main conduit to increase the braking force generated by the braking force generating mechanism; and a pump provided in the auxiliary conduit. A suction conduit and the discharge conduit of the pressure regulating reservoir act as the auxiliary conduit. Furthermore, the first reservoir port of the pressure regulating reservoir is connected to the brake hydraulic pressure generating mechanism via the auxiliary conduit, and the second reservoir port of the pressure regulating reservoir is connected to a suction port side of the pump via the auxiliary conduit.

In the brake apparatus, the suction port side of the pump is connected downstream of the pressure regulating reservoir. Thus, unstable movements of the ball valve caused by the effects of fluid forces and spring forces acting on the ball may become conspicuous. However, such ball instability can be eliminated through the application of the pressure regulating reservoir according to any one of the first to fourteenth aspects to such a brake apparatus.

BRIEF DESCRIPTION OF THE DRAWINGS

Other objects, features and advantages of the present invention will be understood more fully from the following detailed description made with reference to the accompanying drawings. In the drawings.

DETAILED DESCRIPTION OF THE PREFERRED EMBODIMENTS

Figure 1:
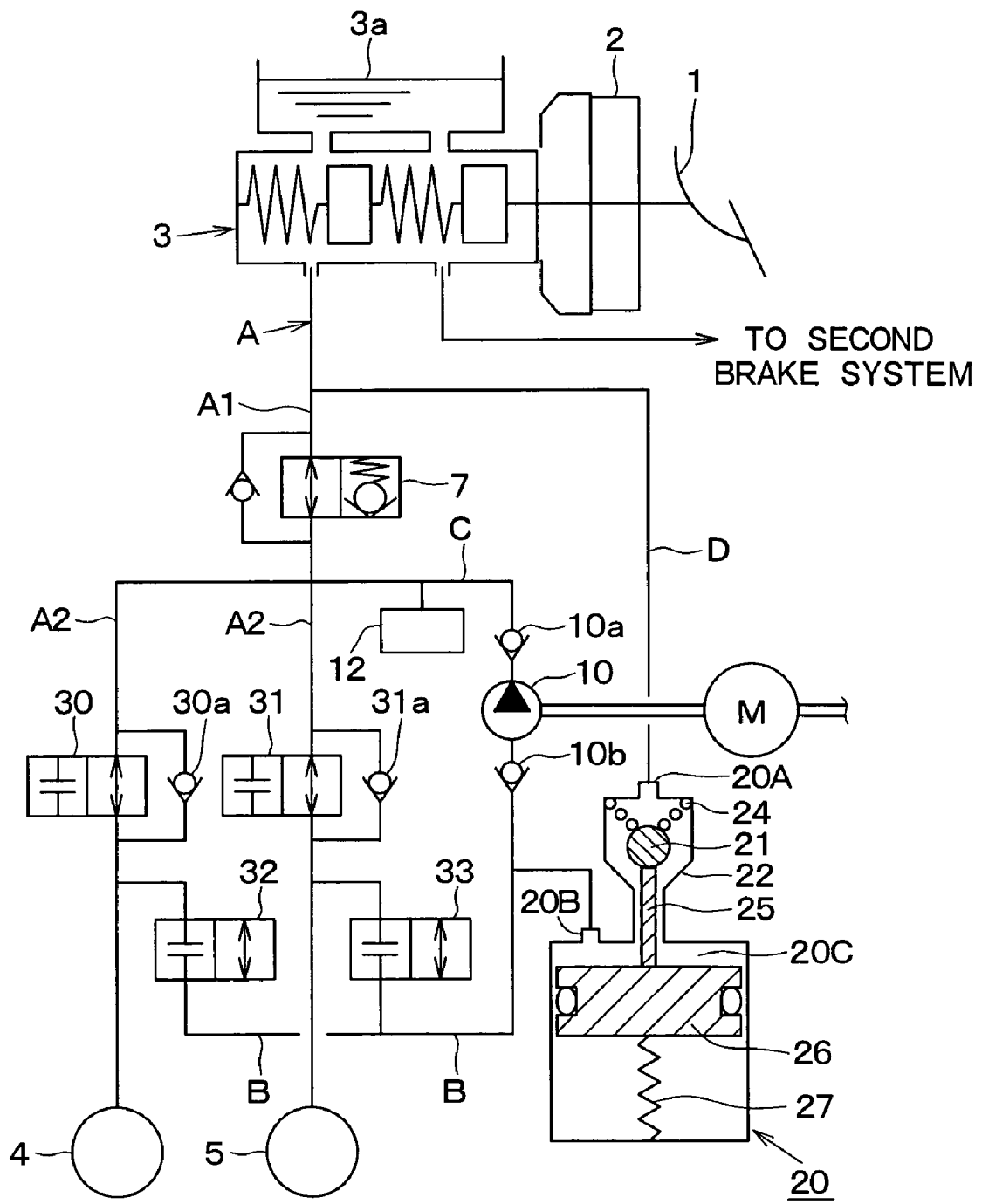
FIG. 1 is a schematic brake conduit diagram of a brake apparatus which is applied to a pressure regulating reservoir according to a first embodiment of the present invention.

The present invention will be described further with reference to various embodiments in the drawings.

Hereinafter, embodiments of the present invention will be described with reference to the drawings. Note that identical reference numerals in the drawings are used for identical or equivalent portions in each of the embodiments.

First Embodiment

FIG. 1 shows a schematic brake conduit diagram of a brake apparatus which is applied to a pressure regulating reservoir according to an embodiment of the present invention. A basic structure of the brake apparatus will be described based upon FIG. 1. The embodiment describes an example for a front-wheel-drive four-wheeled vehicle, where the brake apparatus according to the present invention is applied to a vehicle with hydraulic circuits of an X brake conduit configuration. The X brake conduit configuration is provided with brake systems for the front right wheel-rear left wheel and front left wheel-rear right wheel.

A brake pedal 1 is depressed by a driver to apply a braking force to the vehicle. As shown in FIG. 1, the brake pedal 1 is connected to a brake booster 2 by which a pedal depression force is boosted.

The brake booster 2 includes a pushrod that transmits the boosted pedal depression force to a master cylinder 3. Pressing of this pushrod against a master piston disposed in the master cylinder 3 in turn generates a master cylinder pressure. The brake pedal 1, the brake booster 2, and the master cylinder 3 form a brake hydraulic pressure generating mechanism.

It should be noted that a master reservoir 3a is connected to the master cylinder 3. The master reservoir 3a supplies brake fluid to inside the master cylinder 3 and holds excess brake fluid from inside the master cylinder 3.

The master cylinder pressure is transmitted via an anti-lock brake system (hereinafter referred to as "ABS") to a wheel cylinder 4 for a front right wheel FR and a wheel cylinder 5 for rear left wheel RL. In other words, the master cylinder pressure is transmitted to a wheel braking force generating mechanism. The following description applies to the side with the front right wheel FR and the rear left wheel RL. A description of a second brake system on the side with a front left wheel FL and a rear right wheel RR is omitted, because it is identical.

The brake apparatus has a brake conduit (main conduit) A that is connected to the master cylinder 3. A differential pressure control valve 7, which is provided in the brake conduit A, divides the brake conduit A into two regions. More specifically, the brake conduit A is divided into a brake conduit A1 and a brake conduit A2. The brake conduit A1 ranges from the master cylinder 3 to the differential pressure control valve 7 for receiving the master cylinder pressure, and is subject to the master cylinder pressure; meanwhile, the brake conduit A2 ranges from the differential pressure control valve 7 to the wheel cylinders 4, 5.

The purpose of the differential pressure control valve 7 is to control an opened state and a differential pressure state. Normally the differential pressure control valve 7 is in an opened state. However, setting it to the differential pressure state makes it possible to maintain a pressure on the wheel cylinders 4, 5 side that is higher than the master cylinder 3 side by a predetermined pressure difference.

Additionally, the brake conduit A branches into two in the brake conduit A2: one is provided with a pressure increase control valve 30 that controls the boosting of brake hydraulic pressure to the wheel cylinder 4, and the other is provided with a pressure increase control valve 31 that controls the boosting of brake hydraulic pressure to the wheel cylinder 5.

Both the pressure increase control valves 30, 31 are structured as two-position valves that can be controlled to open and close by an electronic control unit (hereinafter referred to as "ECU") for brake hydraulic pressure control (not shown). When such a two-position valve is controlled to open, brake hydraulic pressure based on the master cylinder pressure or the like can be applied to the wheel cylinders 4, 5. The pressure increase control valves 30, 31 are controlled to be constantly open in cases of normal braking where a brake hydraulic pressure control such as ABS control is not executed.

Also note that the pressure increase control valves 30, 31 are respectively provided with safety valves 30a, 31a in parallel. Releasing the brake pedal 1 during ABS operation thus triggers the expulsion of brake fluid from the wheel cylinders 4, 5 side.

Furthermore, the brake conduit A between the pressure increase control valves 30, 31 and the wheel cylinders 4, 5 is connected to a reservoir port 20B of a pressure regulating reservoir 20 via a brake conduit B. Allowing brake fluid to escape to the pressure regulating reservoir 20 via the brake conduit B thereby controls the brake hydraulic pressure in the wheel cylinders 4, 5. This in turn can suppress to occur wheel locking. The pressure regulating reservoir 20 will be described in more detail later.

In addition, pressure decrease control valves 32, 33 that can be controlled to open and close by the ECU are disposed in the brake conduit B. The pressure decrease control valves 32, 33 are set to be constantly open in cases of normal braking (with no ABS operation). Both are closed as appropriate in cases where brake fluid is allowed to escape to the pressure regulating reservoir 20 as described above.

A brake conduit C connects the brake conduit A between the differential pressure control valve 7 and the pressure increase control valves 30, 31 with the reservoir port 20B of the pressure regulating reservoir 20. Disposed in the brake conduit C are a pump 10 as well as safety valves 10a, 10b.

In addition, an accumulator 12 is disposed downstream of the pump 10 in the brake conduit C. The accumulator 12 is used to decrease pulsation of brake fluid discharged from the pump 10. A brake conduit D is provided so as to connect a reservoir port 20A and the master cylinder 3. Brake fluid from the brake conduit A is sucked up by the pump 10 via the brake conduit D and the pressure regulating reservoir 20, which is then discharged to the brake conduit A2 via the brake conduit C and a portion of the brake conduit B. Such brake fluid is then used to increase the wheel cylinder pressure. In this case, the brake conduits B, C, D act as auxiliary conduits.

Figure 2A:
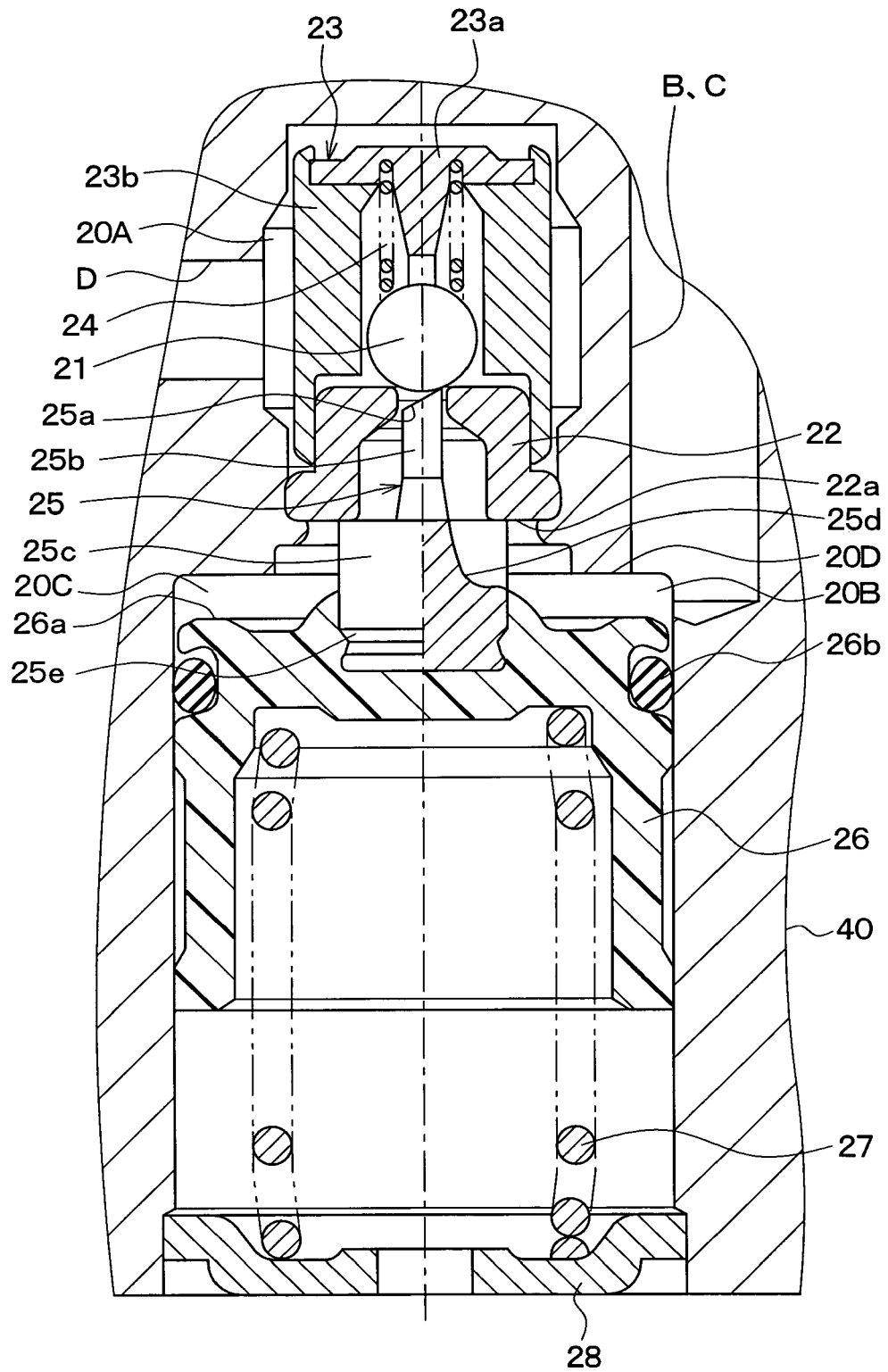
FIG. 2A is a cross sectional view showing specific cross section of the pressure regulating reservoir provided in the brake apparatus of FIG. 1.

Next, the structure of the pressure regulating reservoir 20 mentioned above will be described. FIG. 2A shows the specific structure of a cross section of the pressure regulating reservoir 20.

The pressure regulating reservoir 20 is mounted within a housing 40 that forms the outer shape of an ABS actuator. Furthermore, the pressure regulating reservoir 20 has the reservoir ports (first and second reservoir ports) 20A, 20B and a reservoir chamber 20C. These are structured by an inner wall of a concave portion formed in the housing 40.

The reservoir port 20A is further structured by a hollow portion formed in the housing 40, and is connected between the master cylinder 3 and the pump 10. It is a location that receives a flow of brake fluid whose pressure is equivalent to the master cylinder pressure from the brake conduit D, which acts as a suction conduit. The reservoir port 20B is further structured by a hollow portion formed in the housing 40 with a diameter that is larger than the reservoir port 20A. The reservoir port 20B is being a location to connect the reservoir port 20A and the brake conduits B, C acting as discharge conduit. Lastly, the reservoir chamber 20C is defined by a wall surface forming the reservoir port 20B in the housing 40 and by a top surface 26a of a piston 26 and the like. Brake fluid flows in via the reservoir port 20A and is stored in the reservoir chamber 20C, and brake fluid is sent out from the reservoir chamber 20C via the reservoir port 20B.

Specifically, a surface of the housing 40 forms the reservoir port 20B, and a portion of the housing 40, namely, an upper end surface 20D of a wall surface that structures the reservoir chamber 20C in the housing 40, forms a stepped portion. The reservoir port 20A is also formed in the upper end surface 20D. Moreover the reservoir port 20A is connected with the brake conduit D, while the reservoir port 20B is connected with the brake conduits B, C.

Fixed to the reservoir port 20A is a unit formed from a ball valve 21, a valve seat 22, a filter component 23, and a spring 24.

The filter component 23 is structured with a circular bottom portion 23a, against which six pillar members 23b are disposed at regular intervals. In addition, a mesh filter (not shown) encircles the periphery of the cylindrical members 23b. Overall, a general cup shape is achieved. Once the spring 24 and the ball valve 21 are accommodated within the filter component 23, the valve seat 22 is press-fit into an opening of the filter component 23. Thus, each of the parts are integrated and formed into a unit.

This unit is fixed to the interior of the reservoir port 20A by caulking a portion of the housing 40 structuring the reservoir port 20A. At the caulked portion, an inner wall of the housing 40 contacts the valve seat 22 so as to encircle the outer periphery of the valve seat 22. Therefore, brake fluid flowing in from the reservoir port 20A passes through the filter in the filter component 23 and then accumulates inside the reservoir chamber 20C.

Furthermore, a shaft 25 separated from the ball valve 21 is provided on the lower side of the ball valve 21. Along with the shaft 25, the ball valve 21 and the valve seat 22 described above configure a pressure regulating valve.

Figure 2B:
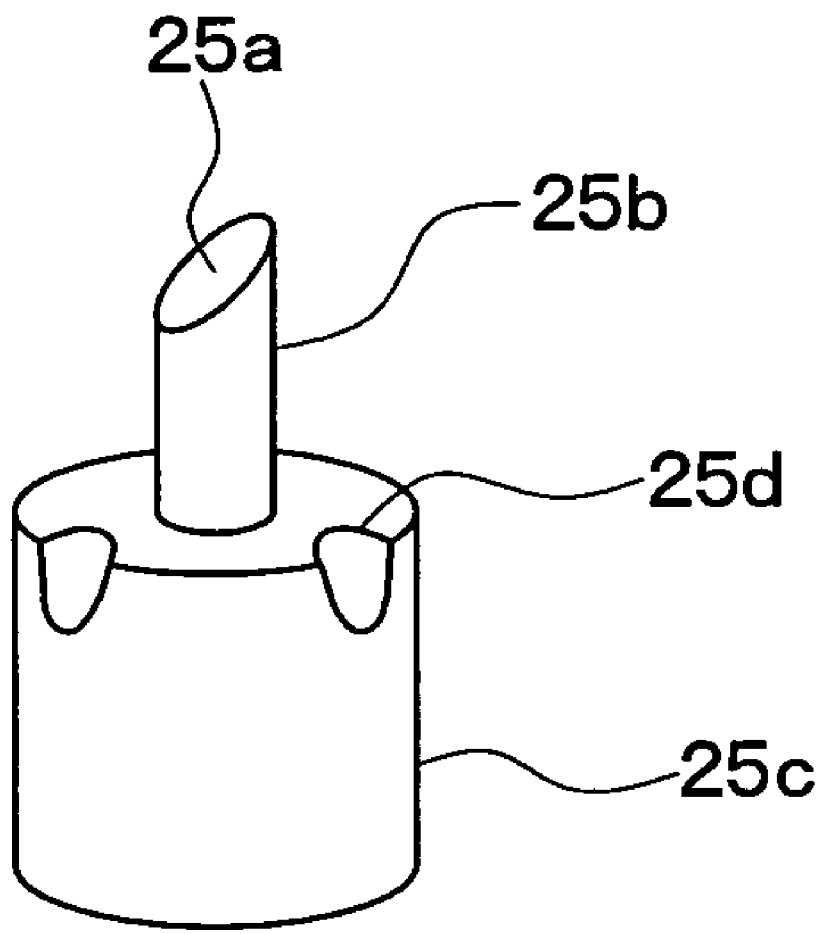
FIG. 2B is a perspective view of a shaft shown in FIG. 2A.

FIG. 2B is a perspective view taken on only a portion of the shaft 25 in FIG. 2A. As shown in FIGS. 2A and 2B, the shaft 25 has a stepped shape and includes a minor diameter portion 25b that forms a seat surface 25a, and a major diameter portion 25c that is larger than the minor diameter portion 25b.

The minor diameter portion 25b has a predetermined stroke and moves in a hole portion (valve hole) of the valve seat 22 so that the ball valve 21 moves in the up-down direction in FIG. 2A. The seat surface 25a provided on the minor diameter portion 25b has a slanted shape, which is inclined a predetermined degree with respect to the axial direction of the shaft 25. The inclined seat surface 25a is designed so as to position the ball valve 21 on the inclined side.

The size of the major diameter portion 25c in the direction of diameter is larger than the hole portion of the valve seat 22. Moreover, the major diameter portion 25c is structured so as to be longer in the axial direction of the shaft 25 than the length of a piston 26 protrusion amount (to be described later) from the bottom surface 22a of the valve seat 22 to the upper end surface 20D of the wall surface forming the reservoir chamber 20C in the housing 40. For this reason, a top surface 26a of the piston 26 does not contact the upper end surface 20D of the wall surface forming the reservoir chamber 20C in the housing 40. However, the major diameter portion 25c contact the bottom surface 22a of the valve seat 22, and a contact point therebetween becomes the top dead center of the piston 26.

Furthermore, notches 25d, which are provided in part such that the entire circumference of the major diameter portion 25c does not contact the valve seat 22, are formed in the major diameter portion 25c. Due to the notches 25d, the hole portion of the valve seat 22 remains in constant communication with the brake conduits B, C acting as the discharge conduit.

The piston 26 that is integrated with the shaft 25 and drivingly associated with the shaft 25; a spring 27 that urges the piston 26 upward in FIG. 2A and generates power to press brake fluid accommodated in the reservoir chamber 20C out; and a stopper 28 for fixing the spring 27 are also provided in the reservoir port 20B.

The piston 26 is formed from resin in the present embodiment. Moreover, the piston 26 is structured so as to slide against the inner wall of the reservoir-port 20B in the up-down direction in FIG. 2A. The major diameter portion 25c of the shaft 25 is insert-molded at a center position of the piston 26, by which the piston 26 and the shaft 25 are integrated. Thus when the piston 26 is accommodated within the reservoir port 20B, an end portion of the shaft 25 therefore contacts the ball valve 21 via the hole portion in the valve seat 22. Note that even if the major diameter portion 25c of the shaft 25 insert-molded to the piston 26 in such a manner, a groove 25e is formed on an outer periphery of a portion among the major diameter 25c embedded in the piston 26 to ensure that the shaft 25 does not separate from the piston 26.

Figure 11:
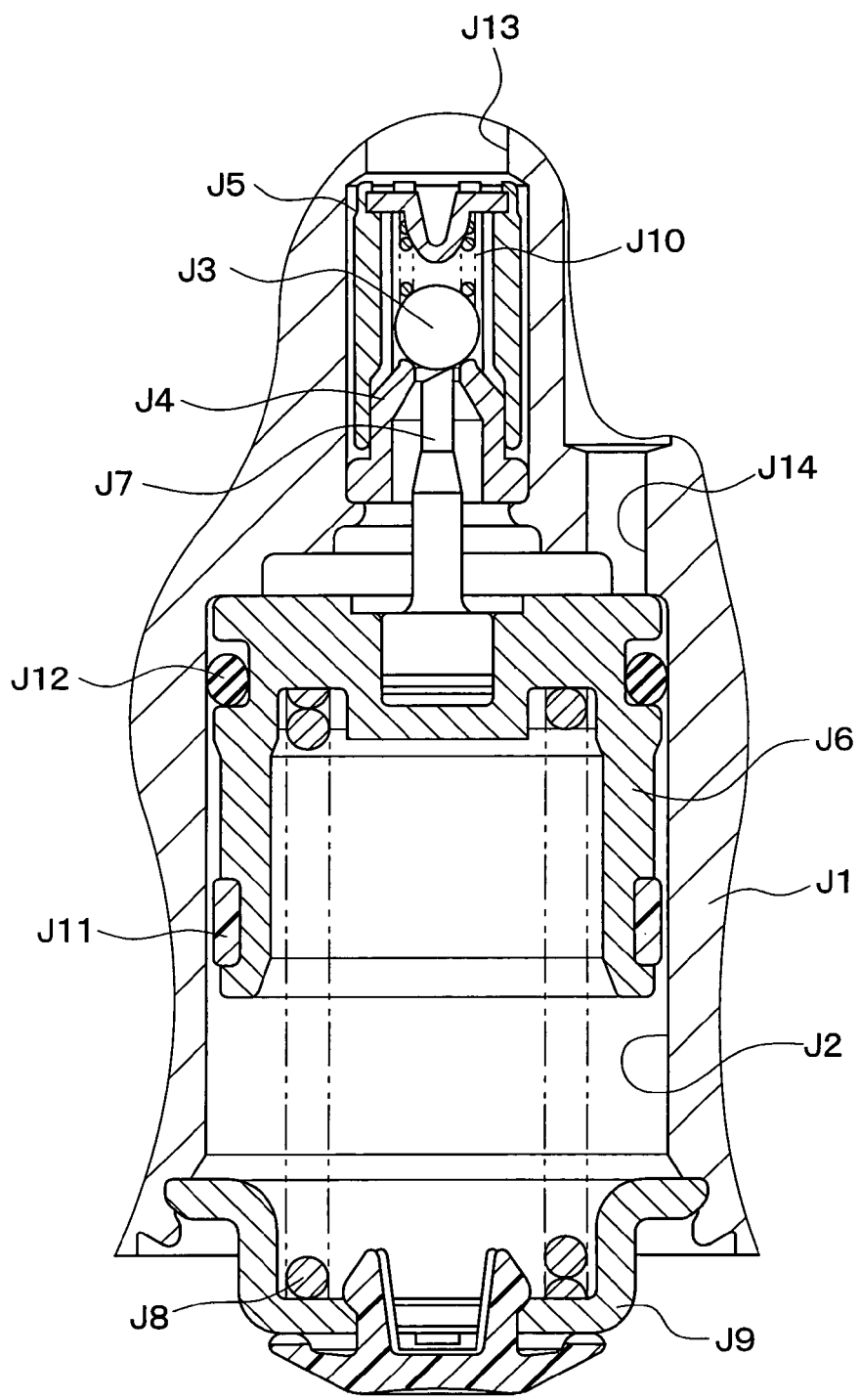
FIG. 11 is a drawing showing a cross sectional structure of a pressure regulating reservoir according to related art.

An O-ring 26b is provided on an outer peripheral surface of the piston 26. Brake fluid leakage via the outer peripheral surface of the piston 26 is thus prevented by the O-ring 26b. Note that in the case of the present embodiment, the piston 26 is made of resin and is designed to slide easily against the inner wall of the metal reservoir chamber 20C. Therefore, a wear ring J11 (see FIG. 11) normally provided on the outer peripheral surface of the piston 26 is not used.

The pressure regulating reservoir 20 has a structure as described above. In such the pressure regulating reservoir 20, during normal braking the piston 26 is pressed upward in FIG. 2A by the elasticity force of the spring 27. This in turn causes an end of the shaft 25 to move the ball valve 21 away from the seat of the valve seat 22. When brake fluid is then supplied via the brake conduit D, the brake fluid thus accumulates in the reservoir chamber 20C via the hole portion in the valve seat 22. The accumulated brake fluid in the reservoir chamber 20C is sucked up by the pump 10 via the brake conduit B and then supplied to both the wheel cylinders 4, 5, which correspond to wheels subject to the brake hydraulic pressure control.

The suction amount of brake fluid to the reservoir chamber 20C subsequently exceeds the suction amount of the pump 10, and a predetermined amount of brake fluid is accumulated inside the reservoir chamber 20C. Once a slide amount of the piston 26 at this time becomes greater than a lift amount of the ball valve 21, the ball valve 21 contacts the seat surface of the valve seat 22. Accordingly, the brake conduit D is closed, and the flow of brake fluid into the reservoir chamber 20C via the brake conduit D is regulated. In this manner, the brake fluid is prevented from flowing into the reservoir chamber 20C until the piston 26 reaches bottom dead center. Furthermore, high-pressure brake fluid farther upstream than the pressure regulating reservoir (on the brake conduit D side) is not supplied as is to the pump 10 positioned downstream (on the brake conduits B, C side).

Figure 3A:
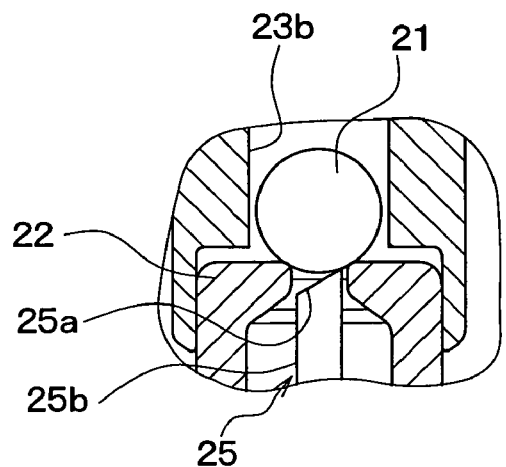
FIGS. 3A to 3C show schematic cross sectional views that illustrate an area in the vicinity of the ball valve while the pressure regulating reservoir is operating.
Figure 3B:
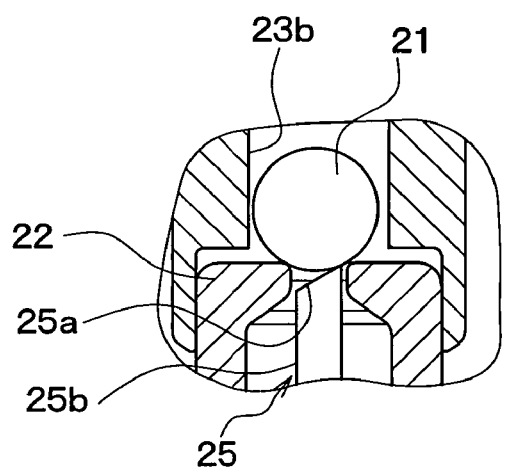
Figure 3C:
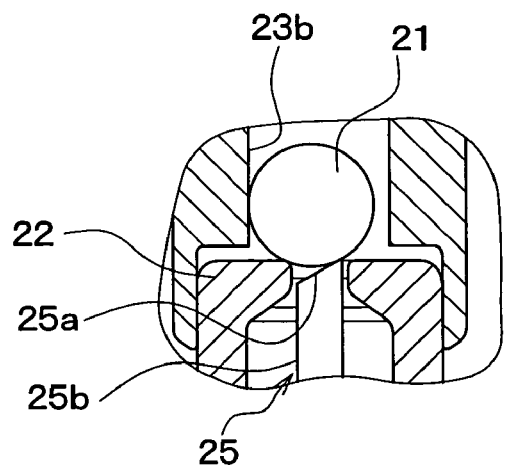

Following is a description of the operation of a brake apparatus having the pressure regulating reservoir 20 structured as described above. FIGS. 3A to 3C show an area in the vicinity of the ball valve during operation, which will be described along with the position of the ball valve 21.

During normal braking in which ABS and assist controls are not executed, the differential pressure control valve 7 is set to an opened state. Therefore, master cylinder pressure generated depressing the brake pedal 1 based on the driver is applied as it is to the wheel cylinders 4, 5. At this time, there is no pump driving, so the ball valve 21 is positioned so as to contact the valve seat 22, as shown in FIG. 3A. The master cylinder pressure therefore does not reach the suction port of the pump 10.

The differential pressure control valve 7 is set to a differential pressure state in cases such as when a vehicle deceleration detected by an acceleration sensor (not shown) or the like exceeds a predetermined threshold. Other cases include when a higher braking force than that during normal braking is desired, that is, when the generation of brake hydraulic pressure is desired for assisting the driver depressing the brake pedal 1. Thus, brake fluid is sent from the brake conduit A1 into the pressure regulating reservoir 20 via the brake conduit D. The pump 10 then discharges brake fluid within the pressure regulating reservoir 20, which is supplied to the brake conduit A2. The wheel cylinder pressure is thus maintained higher than the master cylinder pressure because the differential pressure control valve 7 is set to the differential pressure state.

Brake fluid flows into the reservoir chamber 20C from the master cylinder 3 side and is sucked up by the pump 10 at this time. Therefore, the ball valve 21 seats on the valve seat 22 and the slanted portion of the shaft 25 as shown in FIG. 3B. In other words, the inclination of the end portion of the shaft 25 results in positioning of the ball valve 21 by the slanted surface of the shaft 25 and a portion of the valve seat 22. Due to multiple points of contact at this time, the ball valve 21 exhibits no unstable movement and stays positioned at the above position. Accordingly, no brake fluid pulsation or the like is generated through unstable movement of the ball valve 21.

There may be cases in which pump suction performance cannot keep up with the amount of brake fluid flowing into the reservoir chamber 20C, resulting in a predetermined amount of brake fluid becoming stored in the reservoir chamber 20C. In such cases, as shown in FIG. 3A, the ball valve 21 sits on the valve seat 22 so as to close the brake conduit A1 (master cylinder 3 side) and the suction port side of the rotary pump 10. The amount of brake fluid in the reservoir chamber 20C decreases once the brake fluid in the reservoir chamber 20C is sucked up by the pump 10. Accordingly, the shaft 25 pushes up the ball valve 21 to supply brake fluid from a side of the master cylinder 3 to the reservoir chamber 20C. High-pressure brake fluid generated depressing the brake pedal 1 based on the driver is then decreased in pressure by the pressure regulating reservoir 20 to ensure that high-pressure brake fluid does not reach the suction port of the pump 10. Brake fluid leakage in the pump 10 can therefore be suppressed, which improves pump discharge performance.

Furthermore, the pump 10 is not driven and the master cylinder pressure remains low if the brake pedal 1 is not being depressed. Accordingly, the ball valve 21 is pushed out as far as possible by the shaft 25, as shown in FIG. 3C. Since the end of the shaft 25 has a slanted surface, the ball valve 21 is positioned at this time so as to contact the slanted surface of the shaft 25 and the cylindrical member 23b. As such, due to multiple points of contact, the ball valve 21 exhibits no unstable movement.

Following is a description of effects obtained from using the pressure regulating reservoir 20 as described in the present embodiment.

As explained above in the present embodiment, a structure is realized in which the major diameter portion 25c of the shaft 25 contacts the bottom surface 22a of the valve seat 22, whereas the top surface 26a of the piston 26 does not contact the upper end surface 20D of the wall forming the reservoir chamber 20C in the housing 40. Therefore, the lift amount of the ball valve 21 can be set using a portion above the major diameter portion 25c of the shaft 25 that contacts the bottom surface 22a of the valve seat 22. That is, the lift amount can be set using only a dimension in the axial direction of the minor diameter portion 25b of the shaft 25.

Accordingly, it is possible to cancel out any variations that may occur when integrating the shaft 25 with the piston 26, or from caulking and fixing the unit including the ball valve 21, the valve seat 22, and the filter component 23 inside the reservoir port 20A. The pressure regulating reservoir 20 can thus be achieved that is easily capable of controlling the lift amount of the ball valve 21.

In the present embodiment, the shaft 25 is fixed to the piston 26 through integral molding, instead of press-fitting the major diameter portion 25c of the shaft 25 into the piston 26. In such cases of integral molding, the shaft 25 does not separate from the piston 26 even if the piston 26 is made from resin, due to the groove 25e formed on the outer periphery of the major diameter portion 25c of the shaft 25. For this reason, the wear ring J11 (see FIG. 11) normally required for a metal piston can be eliminated, thus simplifying components of the pressure regulating reservoir 20.

Furthermore, the major diameter portion 25c of the shaft 25 contacts the bottom surface 22a of the valve seat 22, while the top surface 26a of the piston 26 does not contact the upper end surface 20D of the wall forming the reservoir chamber 20C in the housing 40. Therefore, the brake conduit B can be provided on the outer periphery side of the reservoir chamber 20C. It is also possible to increase strength by increasing the housing thickness between the reservoir port 20A and the brake conduit B. Increasing the passage diameter of the brake conduit B is also possible.

In such the configuration, only a narrow area consisting of the top surface of the major diameter portion 25c of the shaft 25 need to be flat compared to be flat a wide area consisting of the entire top surface of the piston J6 as in the related art. This consequently reduces some of the difficulty involved in the machining.

The structure of the pressure regulating reservoir specified in Japanese Patent Laid-Open Publication No. 2000-142346 designates a reservoir chamber top surface (a stepped portion) as the top dead center of the piston J6. Moreover, a protrusion is provided on the top surface of the piston J6 so as to contact the reservoir chamber top surface. A valve seat J4 does not contact the top surface of the piston J6. Accordingly, if a foreign substance enters the pressure regulating reservoir and becomes sandwiched at top dead center, the lift amount of a ball valve J3 will deviate from a set amount.

Additionally, the contact location between the piston J6 top surface determining top dead center and the upper end surface of the wall forming the reservoir chamber in a housing J1 is positioned separate from a main flow passage that communicates with a hole of the valve seat J4 and a passage J14. If a foreign substance becomes sandwiched at this separate position, the foreign substance remains sandwiched because there is no flow of fluid to dislodge it.

Consequently, the flow of brake fluid from the master cylinder side into the pressure regulating reservoir becomes insufficient, resulting in the pump being unable to suck up a required amount of fluid. Depending on the size of the sandwiched foreign substance, the ball valve J3 may not be able to lift from the valve seat J4, thus closing the flow passage. This could result in a complete failure of the pump to suck brake fluid up.

In light of this issue, the pressure regulating reservoir 20 according to the present embodiment thus positions the contact location between the bottom surface 22a of the valve seat 22 and the major diameter portion 25c of the shaft 25 within a flow passage, which communicates with the hole portion of the valve seat 22 and the reservoir port 20B.

For this reason, even if a foreign substance becomes sandwiched between the bottom surface 22a of the valve seat 22 and the major diameter portion 25c of the shaft 25, the foreign substance can be discharged to outside the pressure regulating reservoir 20. This is achieved by brake fluid flowing in from the brake conduits B, C, which are equivalent to discharge conduits.

In particular, the diameter of the contact location between the bottom surface 22a of the valve seat 22 and the major diameter portion 25c of the shaft 25 is set smaller than the diameter of the piston 26 in the present embodiment. The above effect can therefore be obtained in a more effective manner, since more brake fluid flows over the entire area of the contact location between the bottom surface 22a of the valve seat 22 and the major diameter portion 25c of the shaft 25.

Second Embodiment

Hereinafter, a second embodiment of the present invention will be described. The brake apparatus provided with the pressure regulating reservoir shown in the present embodiment is basically identical to that in the first embodiment. Only portions specific to the pressure regulating reservoir are modified with respect to the first embodiment. Therefore, the description will focus only on portions that are different, and omit explanations of portions in the second embodiment identical to those in the first embodiment.

Figure 4:
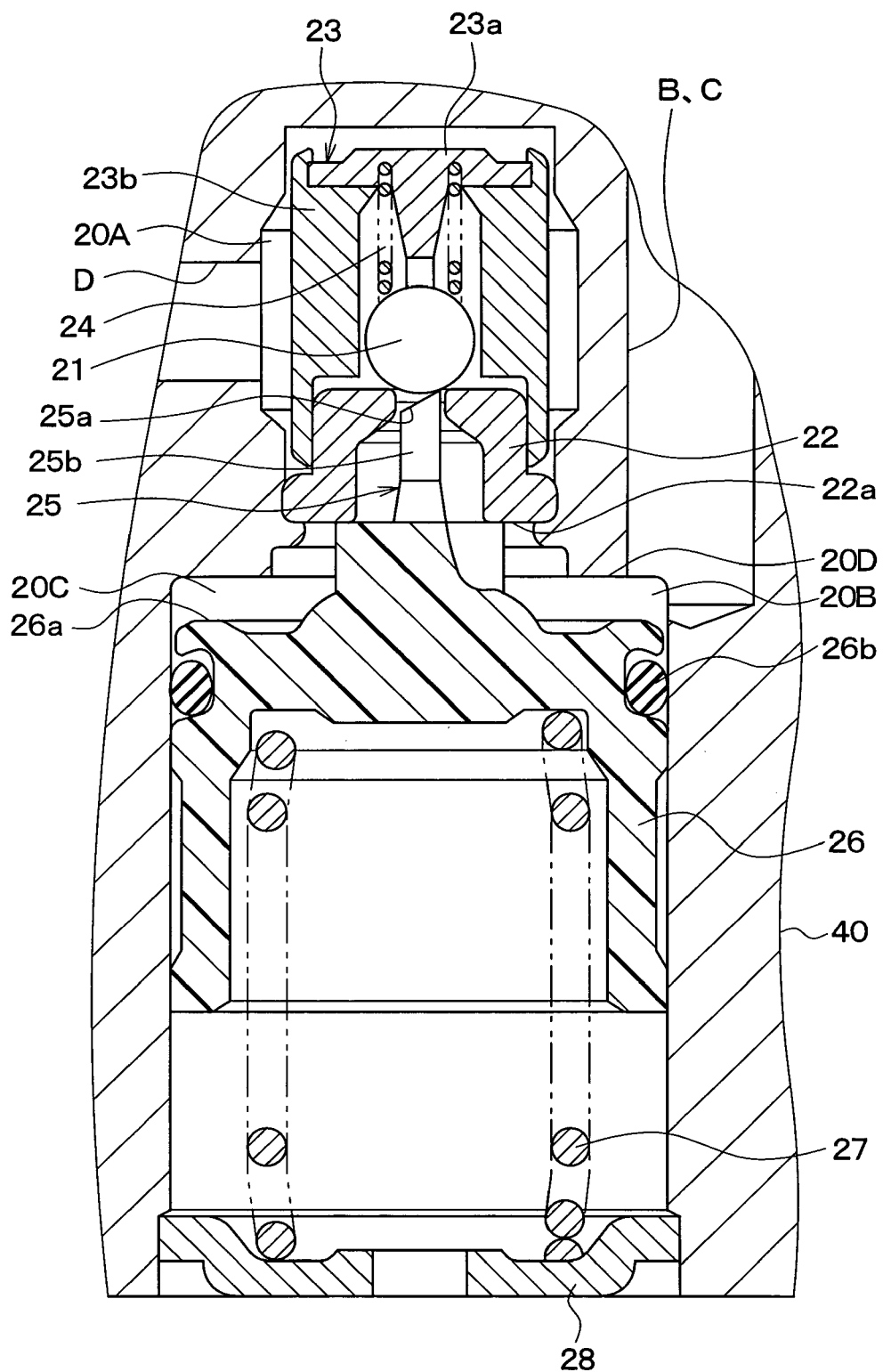
FIG. 4 is a cross sectional view showing a cross section of the pressure regulating reservoir according to a second embodiment of the present invention.

FIG. 4 shows a cross sectional structure of the pressure regulating reservoir 20 according to the present embodiment. In the first embodiment, the shaft 25 and the piston 26 are structured from different materials. However, both are made from the same material in the present embodiment.

As shown in FIG. 4, the shaft 25 and the piston 26 are structured from the same resin. Both may, for example, be formed through integral molding of resin.

In other words, as described above, the lift amount of the ball valve 21 can be controlled using a portion above the major diameter portion 25c of the shaft 25, that is, using only the size of the minor diameter portion 25b. Therefore, forming the major diameter portion 25c and the piston 26 through integral molding has no effect on controlling the ball valve 21 lift amount. It is thus possible to simplify components of the pressure regulating reservoir 20 by using the same material to form the shaft 25 and the piston 26.

Third Embodiment

Hereinafter, a third embodiment of the present invention will be described. The brake apparatus provided with the pressure regulating reservoir shown in the present embodiment is basically identical to that in the first embodiment. Only portions specific to the pressure regulating reservoir are modified with respect to the first embodiment. Therefore, the description will focus only on portions that are different, and omit explanations of portions in the third embodiment identical to those in the first embodiment.

Figure 5A:
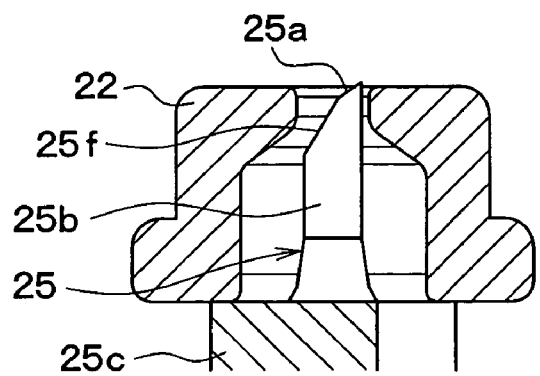
FIG. 5A is a partial enlarged cross sectional view of the vicinity of a shaft of the pressure regulating reservoir according to a third embodiment of the present invention.
Figure 5B:
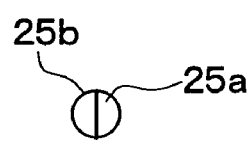
FIG. 5B is an enlarged top surface view of the appearance of an end of the shaft when viewed from an upper side in the axial direction.

FIG. 5A shows a partial enlarged cross sectional view of the vicinity of the shaft 25 of the pressure regulating reservoir 20 according to the present embodiment. Meanwhile, FIG. 5B shows the end of the shaft 25 when viewed from an upper side in the axial direction. In the first embodiment, the seat surface 25a is formed by inclining the end of the minor diameter portion 25b of the shaft 25. However in the present embodiment, the minor diameter portion 25b has a two-stepped tapered shape by further providing a tapered surface 25f at a different position from the incline forming the seat surface 25a. More specifically, the tapered surface 25f is provided at a position displaced from the seat surface 25a in the axial direction.

Furthermore, the tapered surface 25f is formed by grinding down a position below a point contacting the ball valve 21 on the seat surface 25a of the minor diameter portion 25b. At the position where the tapered surface 25f is formed, the cross sectional area of a surface perpendicular to the axial direction of the minor diameter portion 25b is smaller than when the tapered surface 25f is not provided. Due to this construction, the following effects can be obtained.

Namely, there is no tapered surface 25f formed on the minor diameter portion 25b of the pressure regulating reservoir 20 described in the first embodiment. Thus compared to the present embodiment, the cross sectional area of the surface perpendicular to the axial direction of the minor diameter portion 25b increases thereby. This in turn reduces the cross sectional area of a portion where brake fluid flows in the hole portion of the valve seat 22, thereby limiting the supply of brake fluid by a corresponding amount.

However, providing the tapered surface 25f on the minor diameter portion 25b, as in the present embodiment, thus allows for a larger cross sectional area of the portion where brake fluid flows in the hole portion of the valve seat 22. Accordingly, it is possible to increase the supply of brake fluid by a corresponding amount. The supply of brake fluid to the pump 10 can therefore be increased. Moreover, pressurization response can be improved when applying pressure to the wheel cylinders 4, 5, particularly in cases where brake fluid flowability is reduced such as in low temperatures.

Fourth Embodiment

Hereinafter, a fourth embodiment of the present invention will be described. The present embodiment modifies the shape of the minor diameter portion 25b of the shaft 25, which is provided in the pressure regulating reservoir 20 according to the third embodiment. Other portions are identical to the third embodiment. Therefore, the description will focus only on portions that are different, and omit explanations of portions in the fourth embodiment identical to those in the third embodiment.

Figure 6A:
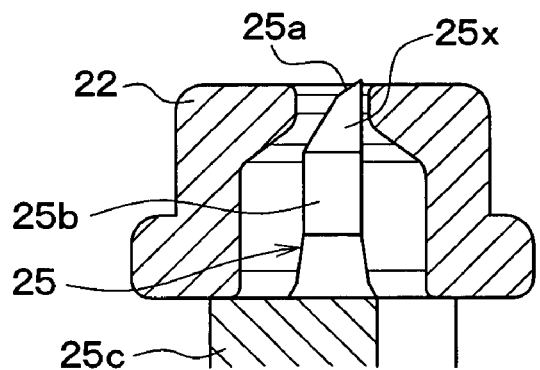
FIG. 6A is a partial enlarged cross sectional view of the vicinity of a shaft of the pressure regulating reservoir according to a fourth embodiment of the present invention.
Figure 6B:
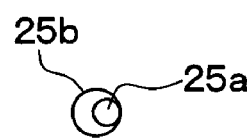
FIG. 6B is an upper enlarged view of the appearance of an end of the shaft when viewed from an upper side in the axial direction.

FIG. 6A shows a partial enlarged cross sectional view of the vicinity of the shaft 25 of the pressure regulating reservoir 20 according to the present embodiment. Meanwhile, FIG. 6B shows the end of the shaft 25 when viewed from an upper side in the axial direction. In the present embodiment, the end of the minor diameter portion 25b of the shaft 25 has a conical shape 25x, by which the cross sectional area of a portion perpendicular to the axial direction decreases as the minor diameter portion 25b approaches the end. The seat surface 25a is formed at the uppermost position of the minor diameter portion 25b.

Such a structure also allows for a larger cross sectional area of the portion where brake fluid flows in the hole portion of the valve seat 22. Accordingly, it is possible to increase the supply of brake fluid by a corresponding amount. Due to this construction, effects identical to those in the third embodiment can be obtained.

Fifth Embodiment

Hereinafter, a fifth embodiment of the present invention will be described. The present embodiment also modifies the shape of the minor diameter portion 25b of the shaft 25, which is provided in the pressure regulating reservoir 20 according to the third embodiment. Other portions are identical to the third embodiment. Therefore, the description will focus only on portions that are different, and omit explanations of portions in the fifth embodiment identical to those in the third embodiment.

Figure 7A:
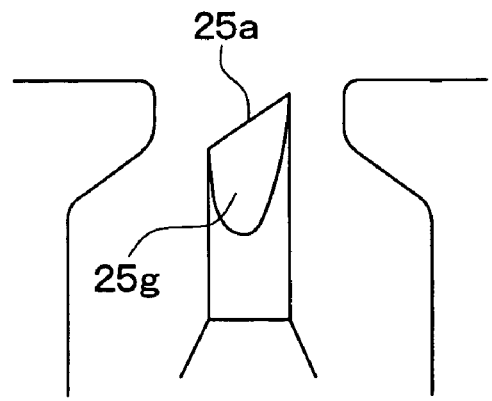
FIG. 7A is a partial enlarged cross sectional view of the vicinity of a shaft of the pressure regulating reservoir according to a fifth embodiment of the present invention.
Figure 7B:
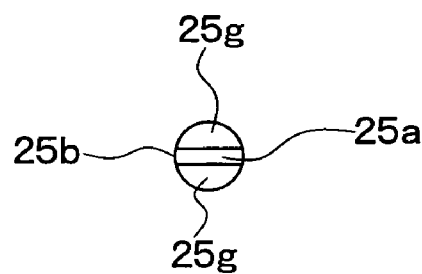
FIG. 7B is an upper enlarged view of the appearance of an end of the shaft when viewed from an upper side in the axial direction.
Figure 7C:
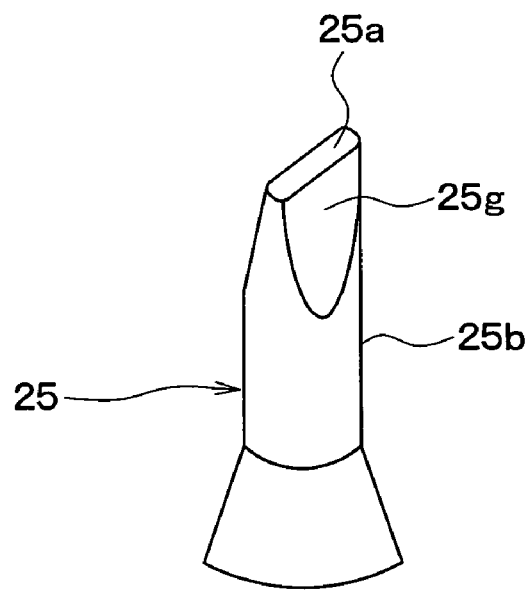
FIG. 7C is a perspective view of the end of the shaft.

FIG. 7A shows a partial enlarged cross sectional view of the vicinity of the shaft 25 of the pressure regulating reservoir 20 according to the present embodiment. Meanwhile, FIG. 7B shows the end of the shaft 25 when viewed from an upper side in the axial direction. FIG. 7C shows a perspective view of the end of the shaft 25. In the present embodiment, tapered surfaces 25g are provided on both sides of the seat surface 25a at the end of the minor diameter portion 25b of the shaft 25. Consequently, the cross sectional area of a portion perpendicular to the axial direction decreases as the minor diameter portion 25b approaches the end.

Such a structure also allows for a larger cross sectional area of the portion where brake fluid flows in the hole portion of the valve seat 22. Accordingly, it is possible to increase the supply of brake fluid by a corresponding amount. Due to this construction, effects identical to those in the third embodiment can be obtained.

Sixth Embodiment

Hereinafter, a sixth embodiment of the present invention will be described. In the above embodiments, the major diameter portion 25c of the shaft 25 has a shape protruding from the top surface 26a of the piston 26. However, a structure is also possible in which the bottom surface 22a of the valve seat 22 protrudes to the piston 26 side from upper end surface 20D of the wall forming the reservoir chamber 20C in the housing 40.

Figure 8:
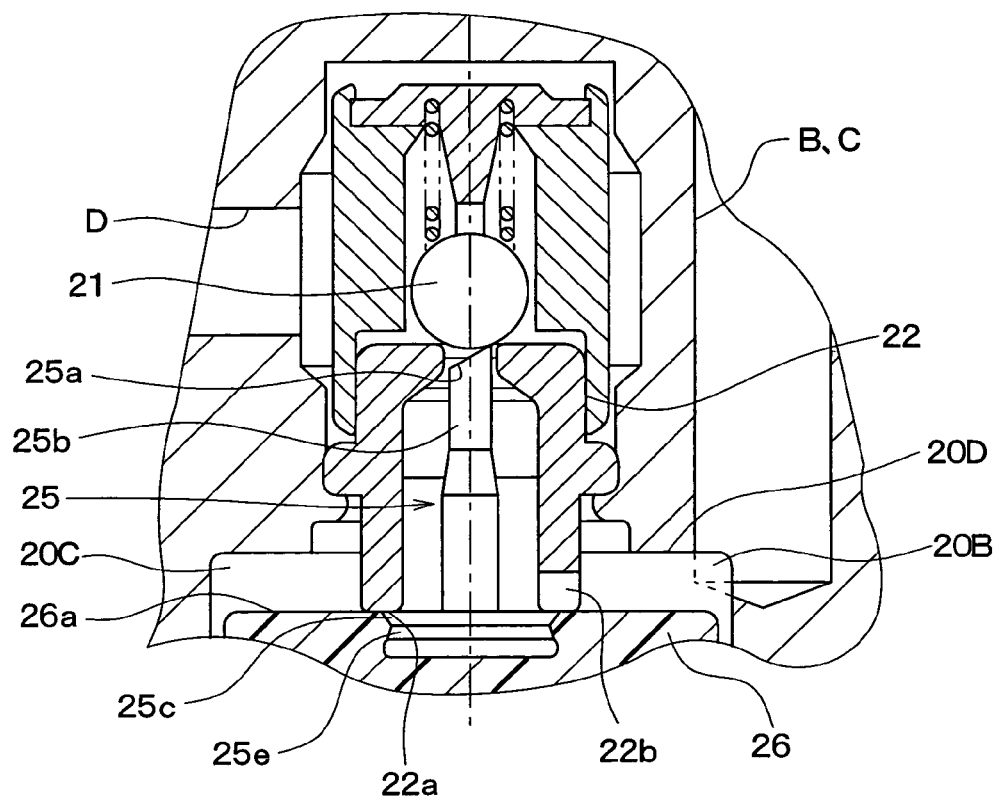
FIG. 8 is a cross sectional view of the pressure regulating reservoir according to a sixth embodiment of the present invention.

FIG. 8 shows a cross sectional view of the pressure regulating reservoir 20 according to the present embodiment. As the figure shows, the bottom surface 22a of the valve seat 22 protrudes from the upper end surface 20D of the wall forming the reservoir chamber 20C in the housing 40. The valve seat 22 fixes to the housing by caulking a portion of the housing 40 to a protruding portion on the outer periphery of the valve seat 22. Also, plural notches 22b are formed on the bottom surface 22a of the valve seat 22, such that brake fluid is able to flow through the notches 22b.

In this manner, effects identical to those in the above embodiments can be obtained, even with a structure in which the bottom surface 22a of the valve seat 22 protrudes from the upper end surface 20D of the wall forming the reservoir chamber 20C in the housing 40.

Other Embodiments

In the above embodiments, examples were described that included forming the ball valve 21, the valve seat 22, the filter component 23, and the spring 24 as a unit. However, these portions need not be formed as a unit. That is, the effects of the present invention can be obtained, provided that in the structure a positional relationship between the ball valve 21 and the seat surface 25a of the shaft 25 is determined by contact between the bottom surface 22a of the valve seat 22 and the shaft 25. In the above embodiments, a cylindrical portion designated as the major diameter portion 25c is used as a positioning contact point. The point determines the positional relationship between the seat surface 25a and the ball valve 21 through contact with the bottom surface 22a of the valve seat 22. However, a shape other than cylindrical may be employed, provided that the shape functions as a positioning contact point.

In the third to fifth embodiments, various modifications were made to the shape of the minor diameter portion 25b so as to reduce the cross sectional area of a surface perpendicular to the axial direction of the minor diameter portion 25b. However, these embodiments illustrate mere examples, and identical effects may be obtained even if the minor diameter portion 25b is formed in another shape.

Furthermore, the piston 26 was described as made from resin in the above embodiments, but it may also be made from metal as in the related art. However, such a case would necessitate the placement of a resin wear ring on the outer periphery of the piston 26. Therefore, simplification of pressure regulating reservoir 20 components cannot be achieved through the omission of the wear ring, as in the case of a resin piston 26.

Figure 9:
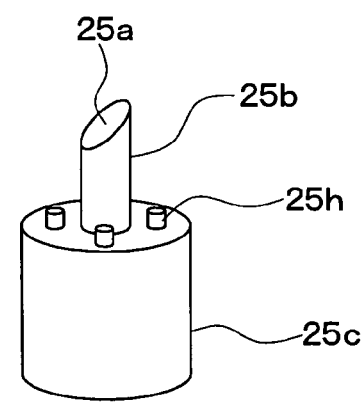
FIG. 9 is a perspective view of a case in which a protrusion is provided on a top surface of a large diameter portion of the shaft shown in other embodiments.
Figure 10A:
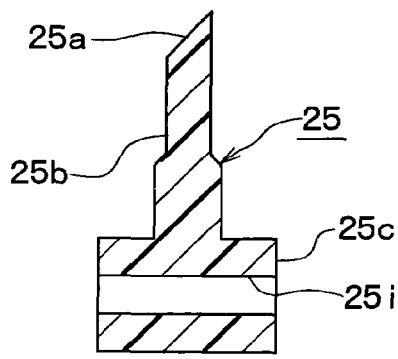
FIG. 10A is a cross sectional view that illustrate a structural example of the shaft shown in other embodiments.
Figure 10D:
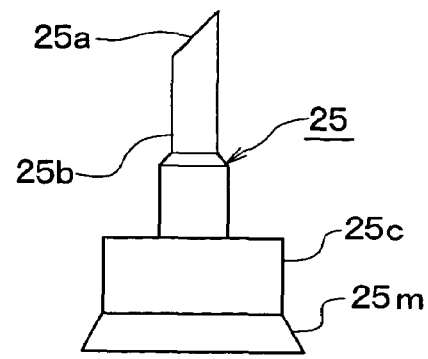
FIGS. 10B to 10E are side views illustrating structural examples of the shaft shown in other embodiments.
Figure 10B:
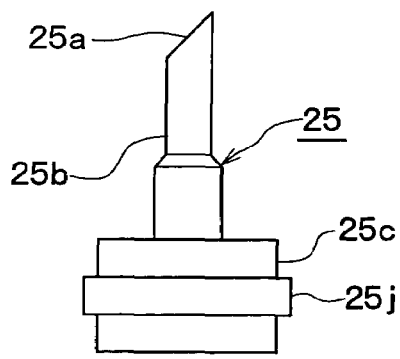
Figure 10E:
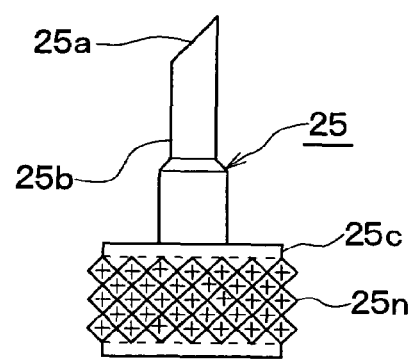
Figure 10C:
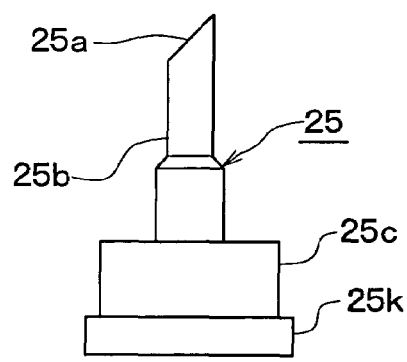

In the first embodiment, notches 25d are provided in the major diameter portion 25c of the shaft 25. However, the notches 25d need not necessarily be provided only on the shaft 25 side. For example, notches may be provided only in the valve seat 22, or provided in both valve seat 22 and the major diameter portion 25c of the shaft 25. Additionally, the description here involved providing notches on the major diameter portion 25c of the shaft 25 or the valve seat 22. However, as FIG. 9 shows, for example, a plurality of objects such as a protrusion 25h may be provided on the major diameter portion 25c of the shaft 25 or the bottom surface 22a of the valve seat 22, in place of notches or the like. Ends of the plurality of protrusions 25h may also be used as a positioning contact point. In such a case, the hole portion of the valve seat 22 and the reservoir chamber 20C can be designed to communicate at a region other than the positioning contact point.

Furthermore, in the above embodiments, an anti-separation structure is achieved such that the shaft 25 does not separate from the piston 26. This is accomplished by forming the groove 25e on the outer periphery of the major diameter portion 25c of the shaft 25. However, it should be noted that this is merely an example. Other examples include employing an anti-separation structure such as shown in FIG. 10.

FIG. 10 shows some examples of a structure of the shaft 25. FIG. 10A is a cross sectional view, and FIGS. 10B to 10E are side views. A through hole 25i may be formed as shown in FIG. 10A, or a flanged protrusion 25j may be formed on the outer periphery of the major diameter portion 25c as shown in FIG. 10B. Additionally, a stepped portion 25k may be formed on the outer periphery of the major diameter portion 25c as shown in FIG. 10C, or a tapered surface 25m whose end widens outward may be formed on the outer periphery of the major diameter portion 25c as shown in FIG. 10D. FIG. 10E shows that a rough portion 25n, achieved by knurling processing for example, may be formed on the outer periphery of the major diameter portion 25c.

While the above description is of the preferred embodiments of the present invention, it should be appreciated that the invention may be modified, altered, or varied without deviating from the scope and fair meaning of the following claims.

What is claimed is:

1. A pressure regulating reservoir comprising:
   a housing;
   a first reservoir port that is provided in the housing, wherein the first reservoir port is connected to a suction conduit provided in the housing;
   a second reservoir port that is provided in the housing, wherein the second reservoir port is connected to a discharge conduit provided in the housing and to the first reservoir port;
   a valve seat that is fixed to the housing forming the first reservoir port, wherein the valve seat has a hole portion forming a passage for fluid flowing in via the suction conduit;
   a ball valve that is positioned inside the first reservoir port farther upstream in the fluid flow passage than the valve seat, wherein the ball valve opens and closes the hole portion by disengaging and engaging the valve seat;
   a shaft that is inserted in the hole portion, wherein the shaft moves in an axial direction identical the inserted direction thereof to contact the ball valve, and the shaft has a seat surface on which the ball valve sits for controlling the opening and closing of the hole portion;
   a piston that is integral to the shaft and slides within the second reservoir port; and
   a reservoir chamber that is positioned in the second reservoir port, communicates with the hole portion of the valve seat, and is defined by the piston and a wall of the housing forming the second reservoir port, wherein
   the shaft includes a minor diameter portion, which is received within the hole portion, and a positioning portion, which includes a positioning contact point that directly contacts a bottom surface of the valve seat, wherein the seat surface is formed on an end of the minor diameter portion,
   the discharge conduit is connected to a portion that is formed from an upper end surface of a wall forming the reservoir chamber in the housing, and
   a space is formed between the top surface of the piston and the entire surface of the upper end surface of the wall forming the reservoir chamber in the housing when the positioning contact point of the positioning portion of the shaft contacts with the bottom surface of the valve seat.

2. The pressure regulating reservoir according to claim 1, wherein the positioning portion is a major diameter portion with a cylindrical shape and a diameter thereof that is larger than the minor diameter portion.

3. The pressure regulating reservoir according to claim 2, wherein at least a portion of the minor diameter portion of the shaft, other than the seat surface formed on the end of the shaft, is formed such that a cross sectional area of a surface perpendicular to the axial direction of the minor diameter portion progressively decreases from the major diameter portion side of the shaft towards the end.

4. The pressure regulating reservoir according to claim 3, wherein the seat surface is a surface inclined with respect to the axial direction of the minor diameter portion, and the minor diameter portion is formed with a two-stepped tapered shape by the seat surface and a tapered surface displaced from the seat surface in the axial direction of the minor diameter portion.

5. The pressure regulating reservoir according to claim 3, wherein the seat surface is a surface inclined with respect to the axial direction of the minor diameter portion, and the end of the minor diameter portion has a conical shape.

6. The pressure regulating reservoir according to claim 3, wherein the seat surface is a surface inclined with respect to the axial direction of the minor diameter portion, and tapered surfaces are provided on both sides of the seat surface at the end of the minor diameter portion.

7. The pressure regulating reservoir according to claim 1, wherein the shaft and the piston are formed from one material.

8. The pressure regulating reservoir according to claim 7, wherein the shaft and the piston are formed of resin by integral molding.

9. The pressure regulating reservoir according to claim 1, wherein a contact location between the bottom surface of the valve seat and the positioning portion is positioned in a flow passage where a flow heads toward the discharge conduit via the hole portion of the valve seat.

10. The pressure regulating reservoir according to claim 9, wherein a diameter of the contact location between the bottom surface of the valve seat and the positioning portion is smaller than a diameter of the piston.

11. The pressure regulating reservoir according to claim 1, wherein the shaft is formed of metal and the piston is formed of resin, with the shaft and the piston formed by integral molding such that a portion of to shaft is embedded in the piston, and a structure for preventing separation from the piston is formed on the portion of the shaft embedded in the piston.

12. The pressure regulating reservoir according to claim 1, wherein at least one of the valve seat and the positioning portion of the shaft has a notch that communicates with the discharge conduit and the hole portion of the valve seat even when the bottom surface of the valve seat and the positioning contact point contact with each other.

13. The pressure regulating reservoir according to claim 1, wherein at least one of the bottom surface of the valve seat and the positioning portion of the shaft has a protrusion that communicates with the discharge conduit and the hole portion of the valve seat even when the bottom surface of the valve seat and the positioning contact point contact with each other.

14. The pressure regulating reservoir according to claim 1, wherein the seat surface is a surface inclined with respect to the axial direction of the minor diameter portion.

15. A brake apparatus including the pressure regulating reservoir according to claim 1, comprising:
- a brake hydraulic pressure generating mechanism that generates brake hydraulic pressure based upon a depression force;
- a braking force generating mechanism that generates a braking force for a wheel based upon the brake hydraulic pressure;
- a main conduit that is connected to the brake hydraulic pressure generating mechanism and transmits the brake hydraulic pressure to the braking force generating mechanism;
- an auxiliary conduit that is connected to the brake hydraulic pressure generating mechanism and supplies brake fluid to the main conduit to increase the braking force generated by the braking force generating mechanism; and
- a pump provided in the auxiliary conduit, wherein
- the suction conduit and the discharge conduit of the pressure regulating reservoir act as the auxiliary conduit, and the first reservoir port of the pressure regulating reservoir is connected to the brake hydraulic pressure generating mechanism via the auxiliary conduit, and the second reservoir port of the pressure regulating reservoir is connected to a suction port side of the pump via the auxiliary conduit.

16. A pressure regulating reservoir comprising:
a housing;
a first reservoir port that is provided in the housing, wherein the first reservoir port is connected to a suction conduit provided in the housing;
a second reservoir port that is provided in the housing, wherein the second reservoir port is connected to a discharge conduit provided in the housing and to the first its reservoir port;
a valve seat that forms the first reservoir port, wherein the valve seat has a hole portion forming a passage for fluid flowing in via the suction conduit;
a ball that is positioned inside the first reservoir port farther upstream in the fluid flow passage than the valve seat, wherein the ball opens and closes the hole portion by disengaging and engaging the valve seat;
a shaft, which is located in the hole portion, wherein the shaft moves in an axial direction thereof to contact the ball, and a seat surface is formed on one end of the shaft, and the seat surface engages the ball for controlling the opening and closing of the hole portion;
a piston that is integral with the shaft, wherein the piston slides within the second reservoir port; and
a reservoir chamber that is located in the second reservoir port, wherein the reservoir chamber communicates with the hole portion of the valve seat and is defined by the piston and a wall of the housing that forms the second reservoir port, wherein
the valve seat has a bottom surface that faces the piston,
the shaft includes a minor diameter portion, which is received within the hole portion, and a major diameter portion, wherein the diameter of the major diameter portion is greater than that of the minor diameter portion,
the major diameter portion includes a positioning contact surface, which faces the ball, and the positioning contact surface directly contacts the bottom surface of the valve seat to define a travel limit of the piston,
the discharge conduit is connected to a portion that is formed from an upper end surface of a wall forming the reservoir chamber in the housing, and
a space is formed between the top surface of the piston and the entire surface of the upper end surface of the wall forming the reservoir chamber in the housing when the positioning contact point of the positioning portion of the shaft contacts with the bottom surface of the valve seat.

* * * * *